(12) United States Patent
Rastegar et al.

(10) Patent No.: US 7,118,825 B2
(45) Date of Patent: Oct. 10, 2006

(54) CONFORMAL POWER SUPPLIES

(75) Inventors: Jahangir S. Rastegar, Stony Brook, NY (US); Thomas Spinelli, Northport, NY (US)

(73) Assignee: OMNITEK Partners LLC, Bayshore, NY (US)

( * ) Notice: Subject to any disclaimer, the term of this patent is extended or adjusted under 35 U.S.C. 154(b) by 633 days.

(21) Appl. No.: 10/236,005

(22) Filed: Sep. 5, 2002

(65) Prior Publication Data

US 2003/0044665 A1  Mar. 6, 2003

Related U.S. Application Data

(60) Provisional application No. 60/317,308, filed on Sep. 5, 2001.

(51) Int. Cl.
*H01M 2/28* (2006.01)

(52) U.S. Cl. .............. 429/121; 429/123; 429/7

(58) Field of Classification Search ............... 429/12, 429/27, 7, 112, 121, 123, 122, 100, 99; 361/306.1, 361/601, 730, 734, 807, 434; 439/500, 504; 307/66; 318/139, 17; 206/701, 703; 323/221
See application file for complete search history.

(56) References Cited

U.S. PATENT DOCUMENTS 5,381,445 A * 1/1995 Hershey et al. ............ 375/295
5,607,784 A * 3/1997 Jalan et al. .................. 429/16

* cited by examiner

*Primary Examiner*—Raymond Alejandro

(57) ABSTRACT

A device including: a structure for housing or supporting at least one power consuming element; and a power supply integrated into the structure, the power supply being electrically connected to the at least one power consuming element for supplying power to the same.

8 Claims, 6 Drawing Sheets

CONFORMAL POWER SUPPLIES

CROSS-REFERENCE TO RELATED APPLICATION

This application claims priority to earlier filed U.S. provisional application Ser. No. 60/317,308 filed on Sep. 5, 2001, the entire contents of which is incorporated herein by its reference.

BACKGROUND OF THE INVENTION

1. Field of the Invention

The present invention relates generally to power supplies, and more particularly, to batteries and power supplies, which are conformable to a structure or integrated into the structure itself.

2. Prior Art

All existing and future smart and guided projectiles and those with means of one-way or two-way communications with a command or tracking station or with each other require electric power for their operation. As munitions are equipped with health monitoring and diagnostics capabilities, they would also require a low level of power supply for long periods of time. The amount of power required for the proper operation of such smart and guided munitions or those equipped with health monitoring and diagnostics capabilities, is dependent on their mode of operation and the on-board devices that have to be powered. The amount of power requirement is relatively small if the projectile is only required to receive a RF or similar signal and to power low power sensors such as MEMs type of accelerometers and rate gyros or health monitoring and diagnostics related electronics. The power required is increased if the projectile is also required to communicate back to the ground or some mobile station. The power requirement becomes significant when the projectile has to be equipped with electric or smart materials based actuation devices for guidance and control, particularly if the projectile is required to become highly maneuverable while traveling at relatively high speeds. As the result, one power source solution is not expected to be practical and/or optimal for all current and planned future applications. The power source requirements and specifications in terms of rate of discharge, mode of activation (if any), charge and leakage levels during storage, acceleration levels to be experienced, etc., also varies significantly from one application to the other. For example, for current and immediate future applications, the following power source requirements are generally regarded to exist:

(1) High capacity, fast rate of discharge and conformal power sources to replace existing power sources on conventional fielded systems such as mortar and artillery. The current power sources include:
 Thermal batteries
 Nickel Cadmium batteries
 Currently available batteries based on Lithium technologies
(2) Power sources for new applications and capabilities such as smart munitions and various FCS (Future Combat Systems) munitions:
 Low-discharge power sources for long-term health monitoring
 Low-discharge power sources for self diagnostics
 High capacity power sources for guidance and control actuation such as electric motors, smart materials based actuators, etc.
(3) Power generation and storage (usually low power and no-charge requirement for safety) for extremely harsh environments for applications such as:
 Advance Kinetic Energy rounds
 Small Arms
 Medium caliber rounds
 Fuses and the like The wide range of power requirements, operating conditions and environmental, safety and reliability issues and shelf life requirements clearly validates the aforementioned conclusion that no single power source can be appropriate and may be optimally designed for all the current and perceived future applications.

In all devices and systems that operate with different types of batteries, whether rechargeable or not, the batteries occupy a relatively large portion of the entire volume of the device or system. This is particularly the case for gun fired projectiles since they are subject to very high accelerations during the firing with accelerations in the order of 10–20,000 g being very common while going up to and over 100,000 g for certain projectiles. In addition, such projectiles will be subject to high levels of vibration, impact type of loading, and certain amount of lower levels of repeated loading and acceleration and deceleration cycles as they are handled during transportation and loading. Thus, appropriate means have to be provided to isolate and protect the batteries and their related components such as contacts, wiring, electronics, etc., from damage such as breakage due to plastic deformation, fatigue or other modes of failure and/or improper operation. Therefore more space is required for housing such protective and impact hardening components. As a result, a considerable amount of the available space has to be assigned to house the batteries and their related components. In addition to the space requirements, one also faces problems related to reliability and survivability of the hardening components during the firing, proper operation at all times, deterioration during long periods of storage and the high cost of production and assembly into the projectile and related hardening efforts and testing.

SUMMARY OF THE INVENTION

As a result, a number of power source technologies and novel concepts for their conformal integration into the structure of projectiles and other devices, some alone and some in combination, are provided herein.

A primary objective of the present invention is to provide conformable power sources that can be integrated into the structure of the projectile or other device with minimal or no loss of the intended functionality of the structure. As a result, all or a significant portion of the space required to house the power source and the aforementioned components can be saved. In addition, the power sources and their related components are better protected against high acceleration loads, vibration, impact loading, repeated loading and acceleration and deceleration cycles that can be experienced during transportation and loading operations.

Some of the characteristics of the innovative conformal power sources provided in this disclosure include:
 Conformal to the available space with any geometrical shape.
 Integrated into the structure of the projectile or other device as a load-bearing member utilizing patented structural designs.
 As load-bearing members, structurally integrated and conformal batteries would also add minimal weight to the entire system.

When used in projectiles, they are capable of surviving and performing during gun firing loads of even in excess of 100,000 g due to their integration into the structure of the projectile.

Capable of withstanding high vibration and impact and repeated loads due to their integration into the structure of the projectile.

Capable of being constructed with various electrochemical batteries, such as metal fuel cells, with thin film battery technologies, with thermophotovoltaic materials for power generation at the nose of supersonic projectiles, with primary or rechargeable batteries for the application at hand.

Capable of covering a wide-range of power requirements, from very low power requirements to large power with high discharge rates.

Eliminate or minimize wiring requirements inside the projectile or device since the structurally integrated and conformal batteries can be distributed throughout the system at the site of the load (sensors, communication electronics, actuation devices, etc.).

Include power sources with zero initial charge for safety, reliability and very long shelf life.

Accordingly, a device is provided which comprises: a structure for housing or supporting at least one power consuming element; and a power supply integrated into the structure, the power supply being electrically connected to the at least one power consuming element for supplying power to the same.

Preferably, the power supply is a load bearing member integrated into the structure.

Preferably, the power supply is a film of power generating material covering at least a portion of the structure. Where the device generates heat on at least a portion of the surface of the structure, the film of generating material is preferably disposed at least partly in the portion of the surface which generates heat and the film of generating material is preferably thermophotovoltaic.

The device preferably further comprises electrical connections disposed on a wall of the structure, the electrical connections being operatively connected to the power supply, wherein the at least one power consuming element is directly attached to the electrical connections without the need for wiring between the electrical connections and the at least one power consuming element.

Preferably, the power supply is a metal fuel cell. More preferably, at least a portion of the housing serves as an anode or cathode of the metal fuel cell. An electrolyte gel is preferably stored in a cavity in the housing to cooperatively interact with the portion of the housing serving as the anode or cathode to produce electrical power. The device preferably further comprises means for initiating the generation of electrical power from the metal fuel cell upon the acceleration of the device.

The device preferably further comprises means for initiating the generation of electrical power from the power supply upon the acceleration of the device.

Preferably, the device is a projectile and the structure is a projectile shell.

alternatively, the device is a disposable electrical device. Preferably, the disposable electrical device is selected from a group consisting of a disposable camera, portable CD player, cassette player, cellular telephone, palmtop, personal digital assistant, and flashlight.

In yet another alternative, the device is a non-disposable device in which the power consuming element is preferably one of a capacitor or rechargeable battery.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1A:
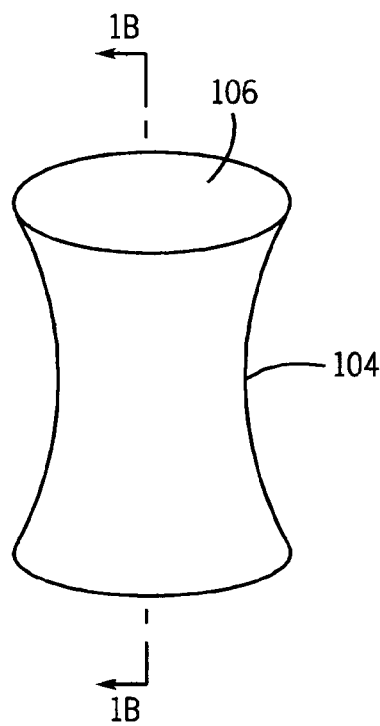
FIG. 1A illustrates a perspective view of a cylindrical structural element battery for use as a battery container in a preferred implementation of the present invention.

The novel power sources that are conformal to the available geometry and which are integrated into the structure of a projectile or other device will now be described in detail. The methods and devices of the present invention and their various components, their general mode of operation, and their general characteristics are provided. The methods and devices are generally divided into two major categories. The first category includes those methods and devices that are primarily based on the utilization of patented Structural Elements for integration of the power sources (batteries) into the structure of projectiles as load bearing members. The patented structural elements are described in U.S. Pat. No. 6,054,197 to Rastegar, the disclosure of which is incorporated herein by its reference. The second category includes those methods and devices that are integrated into the structure of the projectile or other device, primarily on the appropriate and/or available surfaces of the projectile shell or device casing as relatively thin layers.

In all the different implementations disclosed in this section, the power source consists of a housing, which-may or may not be an active component of the battery, and an appropriate chemical material, preferably in the form of a polymer (such as lithium-ion polymer) or gel or even fluid (as utilized in various primary or rechargeable batteries) which is sealed within the housing. Hereinafter, the latter chemical is referred to as the "battery chemical" without intending to limit the battery medium that may be used to any specific medium. The housing can then be constructed in any desirable shape and geometry to conform to the available spaces within the projectile shell or device casing. In the most preferred design, the housing is constructed as part of the structure of the projectile or device as a load bearing member, thereby minimizing the space required to house the resulting power source.

The basic geometry of the battery housing is preferably in the form of the patented Structural Elements disclosed in U.S. Pat. No. 6,054,197 to Rastegar shown in FIG. 1A. A schematic of the longitudinal cross-section of the structural element is shown in FIG. 1B. Each structural element 100 is constructed with a relatively thin housing 102, preferably in a cylindrical shape, forming a fully enclosed container. As shown in FIGS. 2 and 3, the Structural elements can take other shapes such as flat or curved 100a, 100b, respectively. The housing 102 is filled completely with a relatively incompressible (battery chemical) medium 103, which may be in the form of fluid, polymer, elastomer or the like or any combination thereof. The top or bottom sides 104 (and in fact even the side walls 106) may be constructed, in part or as a whole, with appropriate metal or non-conducting materials to allow the separation of the battery anode and cathode and to minimize leakage. If such a structural element were loaded in compression with the force Fc, then the sidewalls 104 would tend to deflect ("buckle") inwards a distance d. By constructing the sidewalls 104 with a small curvature, a small movement of the top and bottom surfaces 106 towards each other would result in a relatively large amplified deflection d. However, since the inside volume 105 of the structural element 100 is filled with relatively incompressible medium 103, internal pressure builds up within the element 100 very quickly and the sidewalls 104 are prevented from deflecting into the medium 103. As a result, such structural elements 100 are relatively rigid and can carry very large loads.

The structural elements 100 described above can be constructed with almost any geometrical shape and size as long as their sidewalls 104 are designed with a slight curvature such that under loading, they tend to deflect into the relatively incompressible battery medium 103 (polymer, gel, etc.).

Figure 4:
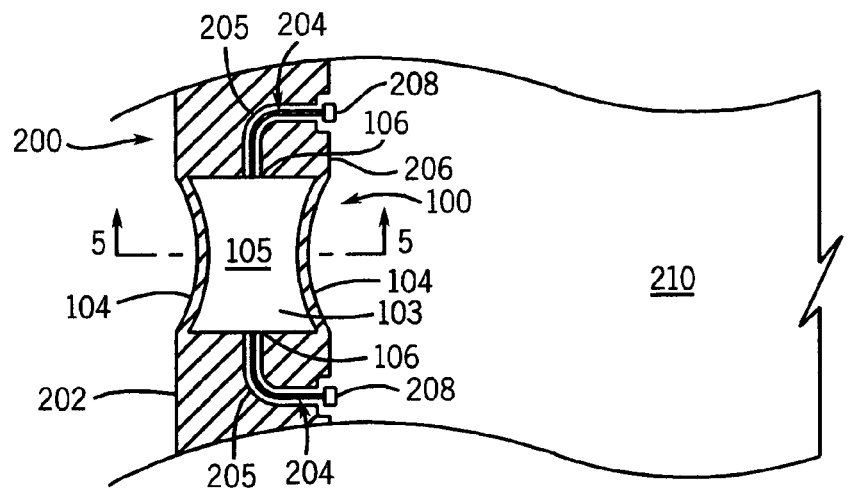
FIG. 4 illustrates a first implementation of a device having a structural element battery.

Referring now to FIG. 4, a first implementation of the structural element battery is shown as an integral part of a composite projectile shell or device casing 200. The structural element battery is formed in a wall 202 of the casing 200 and has electrical connections 204 which preferably terminate on an inner surface 206 of the wall 202 at contact pads 208. If the casing wall 204 is conductive, the wiring 204 needs electrical insulation 205 to isolate it from the casing wall 202. An power consuming component (not shown) can then be disposed on the inner surface 206 in an interior 210 of the projectile or other device with its electrical connections directly contacting the contacts 208, thus eliminating the need for internal wiring. Although one structural battery 100 is shown, a plurality can be provided in the casing wall 202 or in other parts of the casing. Each battery can correspond to a power-consuming component or several structural element batteries 100 can be electrically connected together to supply power to a power-consuming component. Those skilled in the art will appreciate that the electrical connections between the structural element battery 100 and the power consuming components and between structural element batteries 100 can be numerously implemented by those of ordinary skill in the art and are therefore shown in schematic form herein. Furthermore, in the remaining Figures showing alternative implementations of the structural element batteries 100 the electrical connections are not shown but are assumed to be present in any configuration necessary to implement their electrical connection to each other and/or to power consuming components. If the casing wall 202 is metallic or otherwise conductive, it may be used as a common cathode or anode for connection to the power consuming components.

Figure 1B:
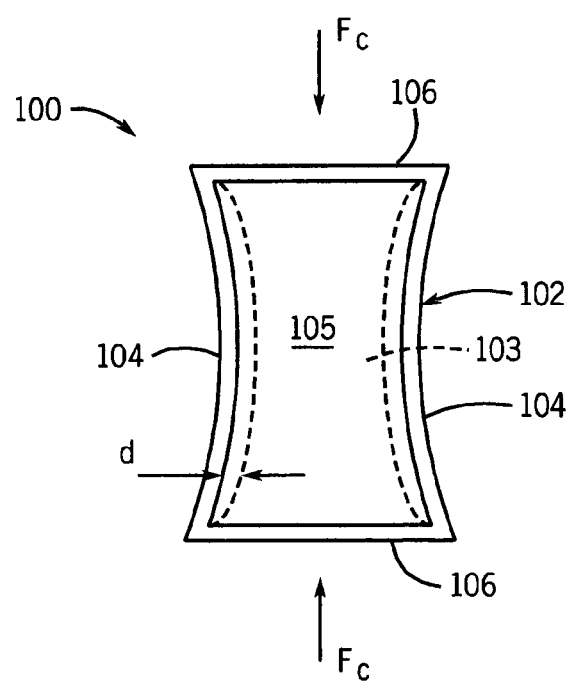
FIG. 1B illustrates a sectional view of the structural element of FIG. 1A as taken along line 1B-1b therein.
Figure 2:
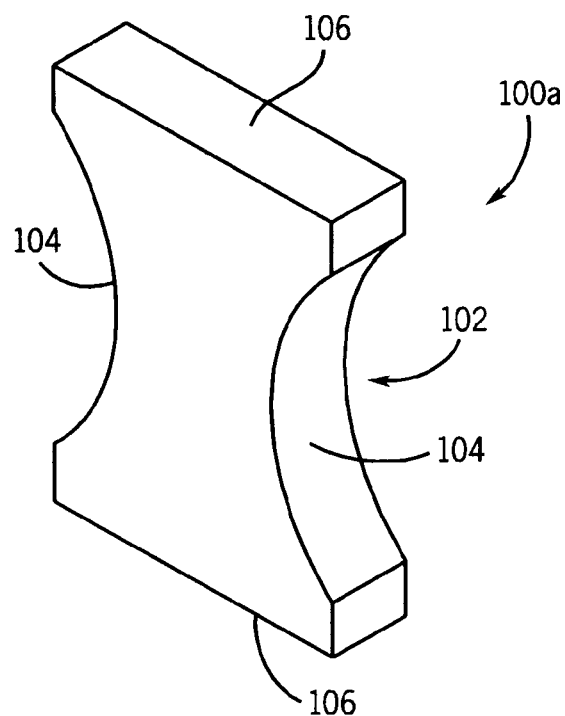
FIG. 2 illustrates an alternative configuration of the structural element battery of FIGS. 1A and 1B having a flat shape.
Figure 3:
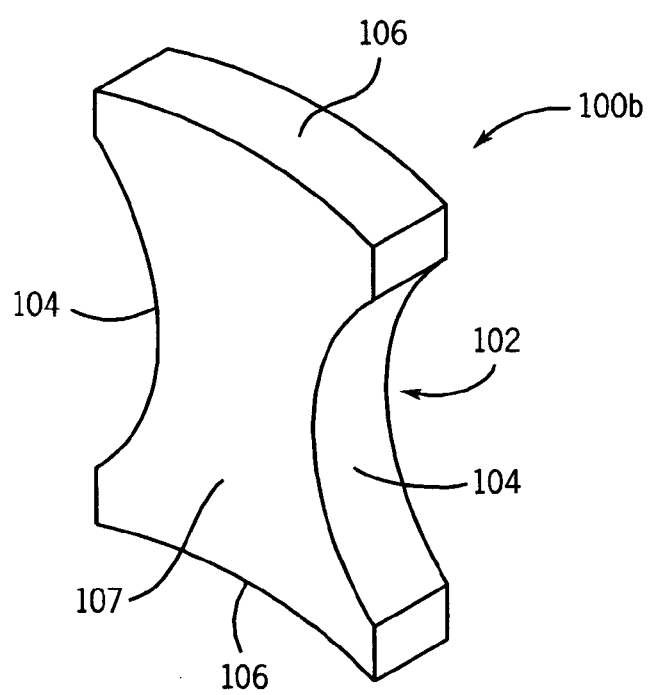
FIG. 3 illustrates another alternative configuration of the structural element battery of FIGS. 1A and 1B having a curved shape.
Figure 5A:
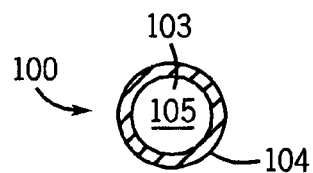
FIGS. 5A and 5B illustrate sectional views of alternative cross-sections of the structural element battery of FIG. 4 as taken along line 5—5 of FIG. 4.
Figure 5B:
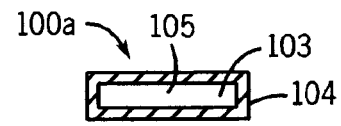
Figure 6:
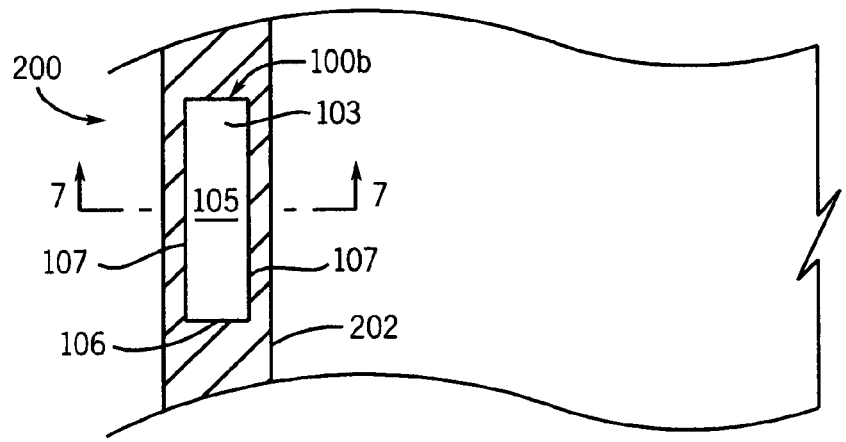
FIG. 6 illustrates a curved structural element battery disposed in a wall of a projectile or device casing.
Figure 7:
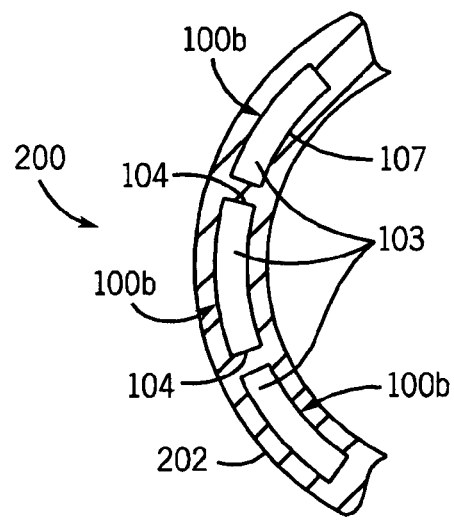
FIG. 7 illustrates a sectional view of the projectile or device casing of FIG. 6 as taken along line 7—7 of FIG. 6.

As shown in FIGS. 5A and 5B, the structural element battery 100 can be cylindrical as shown in FIGS. 1A and 5A or flat as shown in FIGS. 2 and 5B. Additionally, the structural element battery 100 can conform to the shape of the casing wall 202 such as those shown in FIGS. 6 and 7. FIGS. 6 and 7 illustrate a curved structural element battery 100b being oriented such that the curved faces 107 conform to a cylindrical wall 202 shape. The flat structural element battery 100a can be similarly configured. However, because the cylindrical structural element 100 is symmetrical about its axis, its orientation need only line up the compressive forces with the top and bottom surfaces 106.

Figure 8:
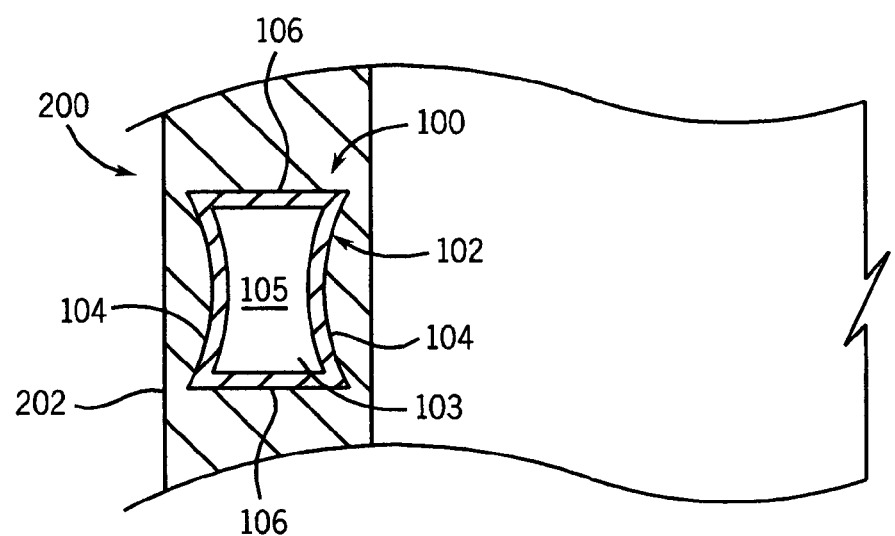
FIG. 8 illustrates a structural element battery having its own casing and disposed in a wall of a projectile or device casing.

Referring now to FIG. 8, the structural element based batteries 100 can alternatively be constructed with a housing 102, such as metal, and then embedded within a wall 202 of a composite projectile shell or device casing 200. Such a configuration requires different internal wiring within the casing wall 202 due to the metallic structural element battery casing 102 and preferably non-conductive casing wall 202. However, if the casing wall 202 is non-conductive, the internal wiring 204 would not have to be electrically isolated from the casing wall 202.

Figure 9:
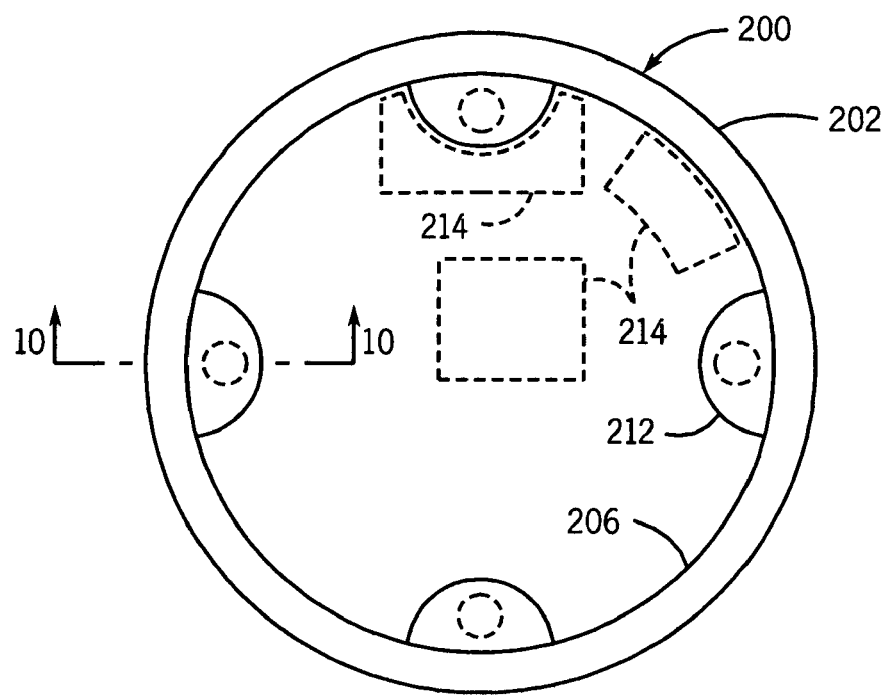
FIG. 9 illustrates a top view of a cylindrical casing having four equally spaced stiffening ribs.
Figures 10A, 10B:
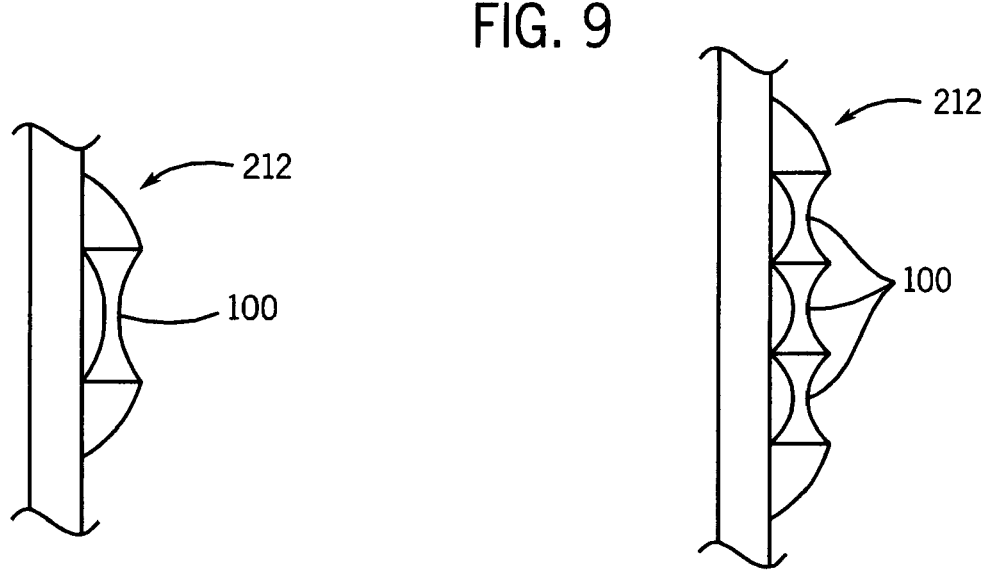
FIGS. 10A and 10B illustrate sectional views of alternative configurations of the stiffening rib of FIG. 9 as taken along line 10—10 in FIG. 10.

Referring now to FIGS. 9, 10a and 10b, the structural element batteries 100 can alternatively be integrated into projections of the casing 200, such as in stiffening ribs 212. For purposes of this disclosure, references to the structural element batteries 100 being integrated into a structure, such as a casing 200, is intended to mean in the structure or any portions connected thereto, such as a stiffening rib 212. FIG. 10 illustrates a cylindrical casing 200 have four equally spaced stiffening ribs 212 by way of example only. Those skilled in the art will appreciate that any shape casing and any number of stiffening ribs can be provided without departing from the scope or spirit of the present invention. The stiffening rib 212 can include a single structural element battery 100 such as shown in FIG. 10A or a plurality of structural elements 100. In such a configuration, the power consuming components (shown schematically by dashed line 214) can be shaped to fit over the stiffening rib 212, or as in the other implementations, directly on an inner surface 206 of the casing wall 202 or in an interior 210 of the casing 200. If the power consuming component 214 is placed in the interior 210 of the casing 200 and not supported directly on an inner wall 206, conventional electrical wiring is used to connect the structural element batteries 100 to the power consuming components 214.

In still another alternative, the structural element batteries 100 can be machined into the structure of the projectile shell or device casing 200 which are then filled with battery medium and sealed.

Those skilled in the art will appreciate that the structure of the resulting projectile shell or device casing 200 is not weakened since such structural elements are load bearing and can be optimally designed to provide the required structural strength and stiffness. In addition, due to the introduction of polymers or gels or the like within the structure of the projectile without reducing its structural rigidity, the structural damping of the projectile or device is greatly increased. The projectile and device structure and its interior elements are therefore able to better withstand shock, vibration and acoustic disturbances. Details on the design, modes of operation, characteristics and method of manufacture of the aforementioned structural elements are discussed in U.S. Pat. No. 6,054,197, the contents of which have been incorporated herein by its reference.

The structural element batteries 100 preferably become an integral part of the structure of the projectile or other device casing 200. Those skilled in the art will also appreciate that such conformable and structurally integrated batteries can be positioned almost anywhere within the structure of the projectile or other device casing 200. The structural element batteries 100 of the present invention would, therefore, make it possible to distribute and position batteries very close or adjacent to the elements requiring electrical power (referred to herein generally as power consuming components). In fact, as discussed above, it becomes even possible to mount such electrical or electronic components directly over or even to such batteries over the structure of the projectile. The need for wiring is thereby minimized and may even be eliminated with the use of contact pads 208 on the casing wall 202 and corresponding pads on the power consuming components. The structural element batteries 100 of the present invention would obviously occupy minimal space and in some applications may not require any space within the structure of the projectile or device casing 200.

Those skilled in the art will appreciate that although any one of the structural element batteries 100, 100a, 100b may be preferred for certain casing 200 configurations, any one may be used without departing from the scope or spirit of the present invention. Furthermore, although the structural element batteries 100, 100a, 100b are preferred for integration into a structure of a projectile or other device casing, such is preferred for the added benefit of adding stiffness against compressive forces on the structure. However, those skilled in the art will appreciate that plain cylindrical, rectangular or other shape batteries can be integrated in the structure, such as in a casing wall 200, without departing from the scope or spirit of the present invention. That is, the structurally integrated batteries do not have to provide a structural stiffness and may even detract from such stiffness.

In another implementation of the structurally integrated batteries of the present invention, the structure itself, for example, the casing wall 202, at least partially, can be made from power producing materials. Recently, great advances have been made in the area of fuel cells, in which metals are used to produce electrical power. Such metal fuel cells have been proposed as an alternative to traditional lead-acid batteries for powering automobiles and scooters or the like. The present invention provides for using such metal fuel cells integrated as part of the structure of a device for producing electricity for the device. Such fuel cells can also be housed in a structural element casing 102 or within a cavity in the casing wall 202 similar to that illustrated in FIG. 4. One of the types of metals used in such metal fuel cells is zinc, where the zinc reacts with air to produce electricity. Another metal currently being developed is aluminum. Aluminum and Zinc, have high energy densities, are environmentally benign, and do not need containment vessels. Aluminum can store approximately 4 kWh/kg of energy while Zinc can store 1 kWh/kg. Both the Zinc and Aluminum work together with an electrolyte solution, which can be in the form of a gel, to generate electricity.

Metal fuel cells which are integrated as part of the structure may be constructed in the shape of the aforementioned structural elements with the aluminum or zinc forming the housing casing 102 and the electrolyte gel 103 filling their inner space 105. With such a design, the resulting battery 100 can function as a load-bearing element, thereby occupying minimal additional space within the projectile shell or device casing 200. Such a power source concept has particular utility where the device has a short life span or where structure has to carry or withstand large loads only during a short time. Such is the situation for projectiles in which have a relatively short life span after they are fired and also for disposable devices which need an internal power supply to power electrical/electronic components. In such situations, the structure (e.g., the casing wall 202), or a portion thereof, can be sacrificed to produce electricity. In the case of projectiles, upon firing, the electrolyte solution can be brought into contact with a portion of the projectiles casing 200, which is fabricated from aluminum or zinc. Electrical energy would then be produced without concern for some amount of degradation of the housing (shell) strength.

Two of the preferred battery technologies for constructing the aforementioned conformal and structurally integrated power sources will now be described. It should, however, be noted that almost any other type of electrochemical batteries can be similarly produced. The following examples are, therefore, not intended to indicate the limitation of the present invention to these battery technologies for the construction of batteries in the form of the aforementioned structural elements. The main reason for selecting the following battery technologies is that they can provide large amounts of power and relatively high discharge rate and can be stored with zero charge for safety reasons. They can also provide long shelf life.

Rechargeable lithium-ion polymer (PLI) batteries are envisioned to be one of the main candidates as storage components for the structurally integrated power sources of the present invention. The advantages of PLI batteries are:

Specific battery energy on the order of 100–150 Wh/kg.

Compliant mechanical properties allowing integration into geometrically complex shapes.

A PLI system preferably provides energy storage and power generation capability. A bank of PLIs can be connected to the rest of the conformal power system (if any) through a power bus. Safety during storage is maximized by discharging the batteries and only injecting charge on command, preferably just prior to an initial use of a device, such as during the few minutes before firing of a projectile.

An aluminum-air fuel cell (AAFC) is an electrochemical engine that directly converts chemical energy to electrical energy. The AAFC consists of a pure aluminum anode, a liquid electrolyte or gel, and a gas diffusion cathode. Airflow over the cathode produces a chemical reaction at the anode, which produces electron flow through an external circuit and produces electrical power.

The advantages of an AAFC for a conformal power system of the present invention are the device is inherently safe because no charge is present during storage and the energy density of the cell has been cited as ~800 Wh/kg The conformal AAFC-operates as follows. The gas diffusion electrode is constructed on a metal substrate next to a cavity that includes the aluminum anode. The metal-housed electrode and the aluminum anode provides the housing of the aforementioned structural elements for high load bearing capability. An inert liquid is used to fill the inner cavity of the structural elements. The liquid electrolyte and uncompressed air will be housed in collapsible chambers that are mechanically in series with the anode and cathode.

All of the reactants are preferably separated during storage to eliminate any risk of explosion. At setback (firing of the projectile) or manually applied shock, the collapsible chambers are crushed by the acceleration of the projectile, pushing the liquid electrolyte and the air into the AAFC (structural element) cavities, replacing the inert liquid. This starts the chemical reaction that provides power during flight. For other devices that do not experience an initial acceleration, the mixing of the reactants can be accomplished by a manual operation, such as a shock or by breaking a seal between the reactants and forcing a mixer through the reactants. Both the breaking of the seal and the forcing of the mixer can be combined into a single step.

In another implementation of conformal power sources of the present invention the battery or power generation device is constructed as a layer of the composite skin of the shell of the projectile or other device. Such power sources are therefore highly conformal to the shape of the structure of the projectile or other device, are effectively load bearing, occupy minimal volume and can withstand very high acceleration loads. One type of such power source is placed at any location on the structure of the projectile and the power consuming components are mounted directly over the region of the structure that contains the power source, thereby eliminating any need for wiring. Two such power sources are given by way of example only, those using thermophotovoltaic materials and those constructed as thin films.

Figure 11:
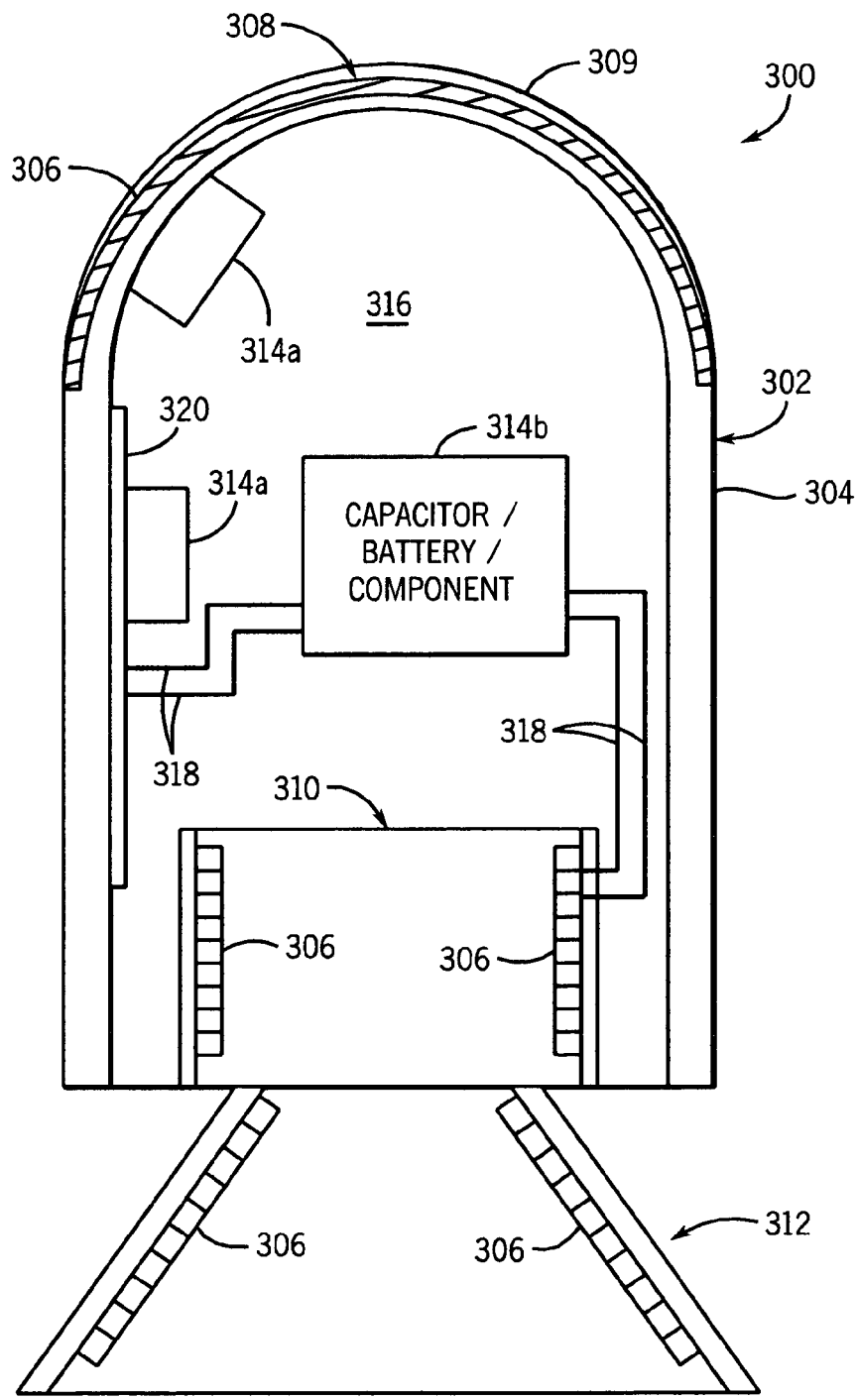
FIG. 11 illustrates a projectile having thermophotovoltaic materials and thin film batteries disposed thereon.

Referring now to FIG. 11, there is shown a schematic illustration of a projectile 300 having a shell 302 comprising a wall 304. Thermophotovoltaic (TPV) materials 306 are capable of generating considerable amount of power within a high temperature region such as the nose 308 of a very high-speed supersonic projectile (for example anti-armor Kinetic Energy projectiles) or within the combustion chamber 310 and/or the nozzle 312 of projectile rockets that are used for range extension. The power source TPV materials 306 have negligible effect on the performance of the rocket furnace and nozzle since it only absorbs radiated energy. As in the case of solar cells (photovoltaics), TPV materials 306 convert energy of incident photons to electricity. In the case of thermophotovoltaics (TPV), for example gallium antimonide (GaSb), cells are tailored to use infrared energy to produce a potential difference and a current. A preferred power source disclosed herein uses thermophotovoltaic materials 306 constructed as a multi-layered cell and integrated into the structure of the shell 302 over the nose 308, rocket combustion chamber 310, and/or nozzle 312. Power from the TPV materials 306 can be used to operate power-consuming components, or to charge capacitors or batteries (collectively referred to as a power consuming component 314a, 314b). Such power consuming components 314a, 314b can be directly connected to the casing wall 304 or in an interior space 316 of the projectile 300 connected by conventional wiring 318. Other devices which give off heat may also benefit from the TPV materials 306 integrated into their structure.

Over the last six to ten years, TPV cells have been tested under a variety of conditions. For example, those in the art tested a heated SiC emitter with a GaSb infrared cell, which could produce 6 amps and 2.6 W over a one square cm surface area. In this case, the SiC emitter was heated to 1500 C. They found that the range for IR response in these cells was well matched to the SiC emitter heated by hydrocarbon combustion. They also found that by changing the SiC configuration and using filters, a 30% efficiency of IR to DC power conversion could be achieved. Recently, some of the same authors have patented a small battery charging device based upon these principals, using high temperature SiC composites and various low bandgap photovoltaic cells. Shielded interconnects and a finned heat exchanger were also found to be necessary in the design. Others in the art have proposed using radioisotope decay to create heat to power TPV cells for spacecraft, claiming that a 25% power conversion efficiency could be achieved.

Recently, development of TPV devices has focused on creating appropriate spectrally selective emitter materials to match with GaSb and other low bandgap photocells. For example, there are those in the art that have used transition metal dopants (Co or Ni) in an IR-transparent MgO ceramic matrix. They found this material to provide high mechanical integrity, thermal shock resistance, excellent heat transfer and near-ideal spectral efficiency. Other low band gap TPV materials under consideration have included InGaAs/InP and InGaSbAs/GaSb with band gaps near 0.6–0.75 eV. Still others have disclosed the use of large band gap (0.75–1.4 eV) TPV devices, which use thermally stimulated rare earth oxides, such as erbium oxide, thulium oxide and holmium oxide.

In any case, the critical issues involve matching a proper band gap TPV material with a corresponding IR emitter to optimize the device. In addition, the emitter must provide mechanical stability and excellent heat transfer as well as an appropriate spectral range. It has been reported recently that a commercial venture has developed a gas-fired heating stove that uses TPV cells, which generate as much as 5 $W/cm^2$ from a heating fuel gas flame. Hence, a large range of temperature, either from frictional generation at the nose 308 of the shell 302 or facing combustion at the range extending rockets (e.g., in the combustion chamber 310 or nozzle (312), will produce DC electric power in the 1 watt or better range during flight of the projectile 300.

The proposed thermophotovoltaic materials 306 based conformal power generators are preferably constructed as a layer under the skin 309 at the desired location at the nose 308 of the projectile 300, within the combustion chamber 310, and/or nozzle 312 of range assist rockets. Such power generation devices 306 have essentially infinite life and are safe because they do not carry any charge since they are activated only following firing. Proper choice of materials and configuration is necessary to optimize the power source 306 for the particular operating conditions and geometry of the projectile 300.

In another implementation of the conformal power supplies of the present invention, deposition of thin-film coating systems onto thin sheets of polymer substrate are provided. The overall cell thickness, including substrate, will preferably be 250 μm (0.010") or less, with a most preferable 175 μm (0.007") thickness.

This very thin architecture will allow the cells 320 to conform to a wide variety of design needs. In addition, the cells 320 are lightweight and rugged, due to an entirely solid state construction. On a production basis, the cells 320 are fabricated as sheets of "battery material," using a continuous coating process known as rollcoating or webcoating. The coated sheets nominally are 45 cm wide by several meters long. Individual cells 320 are cut to any size or shape from such sheets using processes such as abrasive waterjet machining. This results in cells 320 and batteries that are highly cost-effective.

The power source provided using such battery sheets 320 is preferably constructed as a layered cell and integrated into the structure of the projectile 300 or other device, preferably at the location of the electrical load (i.e., the power consuming component 314 is directly connected to the cell). As such, the need for any wiring is reduced or eliminated. Alternatively, power consuming components 314 in the interior space 316 of the projectile 300 or other device can be connected to the cells 320 by conventional wiring 318. In summary, the thin-film battery cells 320 and its method of conformal integration into the structure of the projectile 300 have the features of being conformal, lightweight, rugged, and relatively modest in cost.

A preferred Cell composition for use in the thermal batteries of the present invention is Li alloy/LiBr—KBr—LiF eutectic/$FeS_2$ (thermal activation). This cell composition is well known from standard, three-dimensional thermal batteries known in the art. The innovation of the present invention with regard to these cells is to translate a proven three-dimensional battery technology into two dimensions to gain the features of conformability, lightweight, and modest cost.

Lithium alloys used typically are either 20 Li:80 Si (wgt %) or 44 Li:56 Al (wgt %). There is no previous disclosure concerning sputter deposition of either alloy material, although sputter deposition of both Si and Al, the primary constituent of either material is well known. This may tend to favor Li—Si alloy as the preferred choice, and this alloy is in fact the one usually used in reserve batteries.

Similarly, sputter deposition of the eutectic mixture of LiBr—KBr—LiF has not been previously disclosed in the art. With a bulk melting point of approximately 313° C., care is needed to sufficiently water cool the target during deposition. Sputtering targets of LiF are commercially available as standard items (e.g., from Cerac, Inc.). Once again, sputter deposition of $FeS_2$ is not known in the prior art. Sputtering targets of sulfides of Cd, Pb, Mo, Nb, Ta and W are all standard items, and therefore the sputter deposition of $FeS_2$ is not a problem.

There may be some concern for the potential separation of the cell coating layers when the electrolyte is melted to activate the cell. However, this does not represent a problem. The electrolyte layer thickness will likely not exceed 10 μm. The surface tension of the molten (perhaps not quite "liquid") electrolyte will keep adjacent layers together. Then, too, the design of the battery made from individual cells will keep those cells confined and somewhat compressed, so electrolyte "mobility" in its molten state is negligible or nothing.

Activation of the thin-film cell preferably uses the same thermal technology used for standard three-dimensional thermal batteries. It is important to note that the upper service temperature of polyimide, the substrate material preferred for this work, is at least 340° C., and may be as high as 400° C. The thermal activation, although shown on a side surface, may also be achieved by locating the batteries at the nose region of a supersonic projectile, close to the range extension rockets, or near the bottom surfaces of the projectile to utilize the high temperature environment of the gun barrel during the launch.

The conformal battery technologies disclosed herein are also particularly well suited for use as disposable batteries for disposable products. The advent of the mobile age has forced battery vendors to improve their products' performance, and new battery technologies are on the way. Not surprisingly, batteries are good business in this mobile age. Currently, the cell phone rechargeable battery market alone saw over $1 billion in revenue and is expected to continually grow until at least 2005. One interesting consequence of the mobile revolution, in which more and more people are arming themselves with disposable cameras, portable CD players, cassette players, cell phones, palmtops, personal digital assistants (PDAs), and flashlights. Most will eventually spend more on batteries than they did on the device itself. As a result, for the right price, individuals will buy a disposable device as well as the battery.

The first mainstream disposable device was the flashlight. When the disposable camera became a huge success it spearheaded new era of disposable devices, with disposable cell phones due out soon. Accelerating this new era is technological advancements that have allowed a tremendous reduction in electronic component cost. The primary barrier for additional disposable devices is cost associated with the disposable battery. A separate power supply adds significant cost due to the battery itself as well as the additional components needed to incorporate and house the battery. These additional components also add space and weight that further adds cost.

Incorporating the battery into the structure of the device, in any manner discussed herein, will reduce the cost of the battery itself as well reduce components, and space, resulting in a miniaturization of the device. The integration of the power supply into the device in any of the ways discussed herein will directly reduce cost and broaden the opportunity for disposable devices. Other advantages include its inherent shock resistance capability, and water resistance.

The power supplies of the present invention can also be used in non-disable devices to supply power to a power consuming component thereof including charging a capacitor or a rechargeable battery.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device comprising:
a structure for housing or supporting at least one power consuming element; and
a power supply formed in or on the structure, the power supply being electrically connected to the at least one power consuming element for supplying power to the same, wherein the power supply is a film of power generating material covering at least a portion of the structure.

2. The device of claim 1, wherein the device generates heat on at least a portion of the surface of the structure, wherein the film of generating material is disposed at least partly in the portion of the surface which generates heat and the film of generating material is thermophotovoltaic.

3. The device of claim 1, further comprising electrical connections disposed on a wall of the structure, the electrical connections being operatively connected to the power supply, wherein the at least one power consuming element is directly attached to the electrical connections without the need for wiring between the electrical connections and the at least one power consuming element.

4. The device of claim 1 wherein the device is a projectile and the structure is a projectile shell.

5. The device of claim 1, wherein the device is a disposable electrical device.

6. The device of claim 5, wherein the disposable electrical device is selected from a group consisting of a disposable camera, portable CD player, cassette player, cellular telephone, palmtop, personal digital assistant, and flashlight.

7. The device of claim 1, wherein the device is a non-disposable device.

8. The device of claim 7, wherein the power consuming element is one of a capacitor or rechargeable battery.

* * * * *